R. S. STENTON.
Cultivator.
No 18,825. Patented Dec. 8, 1857
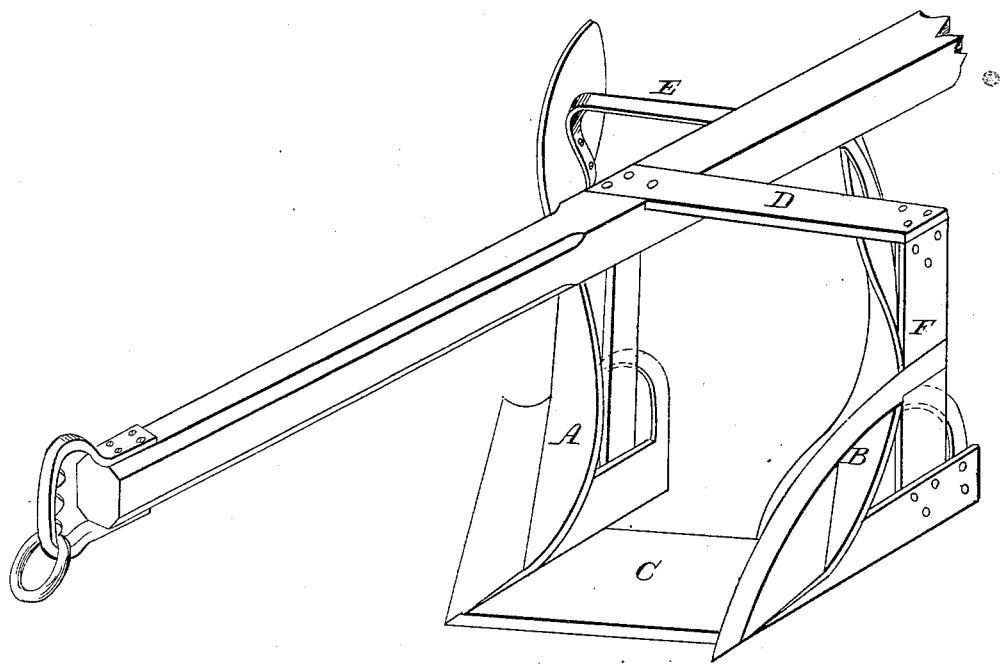

UNITED STATES PATENT OFFICE.

R. S. STENTON, OF NEW YORK, N. Y.

IMPROVEMENT IN PLOWS.

Specification forming part of Letters Patent No. 18,825, dated December 8, 1857.

*To all whom it may concern:*

Be it known that I, R. S. STENTON, of New York, in the county of New York and State of New York, have invented an Improvement in Double Plows; and I do hereby declare that the following is a full, clear, and exact description of the principle or character which distinguishes it from all other things before known, and of the usual manner of making, modifying, and using the same, reference being had to the annexed drawing, of which—

Figure 1 represents a perspective view of the plow.

My invention consists in an improvement in double plows, especially of that class known as the "prairie-plow," by the introduction of an intermediate share between two plows in the manner hereinafter set forth.

The object of my invention is to turn a given width of sod by two plows with less labor than the same width can be turned by a single plow. A single twelve-inch "prairie-breaker" is worked by two good horses, while a twenty-four-inch breaker requires eight horses. To attain my object and diminish this ratio of increased labor resulting from increasing the size of the plow, and at the same time to make an efficient double or gang plow, I unite the fore part of the sole of a single plow with the share of one which succeeds it, as follows: The special construction of the plow is not material, provided it be adapted to the breaking of prairie land or similar work. To the foremost plow, A, at or near its point, I attach to its sole an under cutter or share, C, which I denominate the "intermediate" share. This share is made flat, or nearly so, and as thin as is consistent with strength, and extends backward in the direction of the sole of the landside, as seen in the drawing. The width of the share may vary as circumstances may require. It may extend the whole length of the landside, but is better of less width, and should not be less than six inches. The cutting-edge of this share recedes at or about the angle of the share of plow A, and is joined to the share of plow B from a point at or near the point of said plow, along the edge of said plowshare. The distance of the point of B from the landside of the plow A in a right line must be twelve inches for twelve-inch plows. These plows are braced together at top by the bars D E, and are intended to be used with colters, one of which is attached to A in the ordinary way and the other attached to B, substantially in the manner seen in the drawing, this latter being attached to the standard F and the other to the plow-beam, in the usual way. The function of the intermediate share is to cut under the sod, so as to render its turning over easy to the plow B, and by relieving the strain upon the landsides of A and B it leaves comparatively little work for the plow B to perform.

What I claim as my invention is—

Uniting two or more plows by an intermediate share, in the manner and for the purposes set forth, said share commencing at or near the point of the plow A and extending backward in the direction of the sole of the landside of said plow and receding obliquely at or about the angle of the share of said plow until it meets the share of plow B, all substantially in the manner set forth.

R. S. STENTON.

Witnesses:
R. T. CAMPBELL,
CHAS. G. PAGE.